United States Patent [19]

Erickson

[11] Patent Number: 4,723,902

[45] Date of Patent: Feb. 9, 1988

[54] BALANCED FLOW EXTRUSION CROSSHEAD AND DIE ASSEMBLY

[75] Inventor: Warren E. Erickson, Muscatine, Iowa

[73] Assignee: Wheeling Stamping Company, Wheeling, W. Va.

[21] Appl. No.: 899,038

[22] Filed: Aug. 21, 1986

[51] Int. Cl.$^4$ ............................................. B29C 47/28
[52] U.S. Cl. .................................. 425/380; 264/173; 425/462; 425/466; 425/467
[58] Field of Search .................... 425/133.1, 462, 467, 425/466, 376 R, 380; 264/173, 176.1

[56] References Cited

U.S. PATENT DOCUMENTS

| | | | |
|---|---|---|---|
| 3,308,508 | 3/1967 | Schrenk | 425/133.1 X |
| 3,321,803 | 5/1967 | Corbett | 425/133.1 X |
| 3,365,750 | 1/1968 | Donald | 425/133.1 |
| 4,047,868 | 9/1977 | Kudo et al. | 425/133.1 |
| 4,152,104 | 5/1979 | Przytulla et al. | 425/462 |
| 4,208,178 | 6/1980 | Przytulla | 425/467 |
| 4,248,824 | 2/1981 | Hattop | 264/171 |
| 4,249,875 | 2/1981 | Hart et al. | 425/133.1 |
| 4,298,325 | 11/1981 | Cole | 425/133.1 X |
| 4,302,170 | 11/1981 | Goron | 425/133.1 |
| 4,305,703 | 12/1981 | Lupke et al. | 425/72 R |
| 4,344,907 | 8/1982 | Herrington | 264/173 |
| 4,362,488 | 12/1982 | Casals et al. | 425/113 |
| 4,365,949 | 12/1982 | Nash | 425/467 X |
| 4,395,221 | 7/1983 | Herrington | 425/467 |
| 4,402,898 | 9/1983 | Rosenbaum | 264/173 |
| 4,484,877 | 11/1984 | Stucke et al. | 425/133.1 X |
| 4,484,883 | 11/1984 | Honda et al. | 425/462 |
| 4,499,041 | 2/1985 | Hahn et al. | 264/173 |
| 4,548,567 | 10/1985 | Missout | 425/113 |
| 4,548,569 | 10/1985 | Pitigliano et al. | 425/113.1 |

Primary Examiner—Richard L. Chiesa
Attorney, Agent, or Firm—Parmelee, Miller, Welsh & Kratz

[57] ABSTRACT

The apparatus includes a crosshead and die assembly for the extrusion of polymeric resins and the like into tubular shapes, for example, of single or multiple layers. A crosshead body has a side fed resin inlet orifice which communicates with a first resin distribution channel extending 180° around an inner mandrel, the first channels having gate orifices at the ends thereof. The gate orifices feed heated resin to a second resin distribution channel which extends 360° around the mandrel and communicates with a first restrictive annular opening which also extends 360° around the mandrel. The first restrictive annular opening feeds resin to a third resin distribution channel which also is formed 360° around the mandrel. A second restrictive annular opening communicates with the third resin distribution channel 360° around its circumference and feeds the molten resin or the like to an annular opening formed between the inner mandrel and the crosshead body. The resin then moves to a die land and is extruded therethrough. The plurality of ring-shaped resin distribution channels and restrictive annular openings provide balanced resin pressure and laminar flow around the inner mandrel. One or more abutting pairs of intermediate distribution plates having the above-described ring-shaped resin distribution channels and restrictive annular openings machined therein may be added to the crosshead body tooling in order to provide one or more additional uniform layers of resin or the like to the extruded product.

10 Claims, 8 Drawing Figures

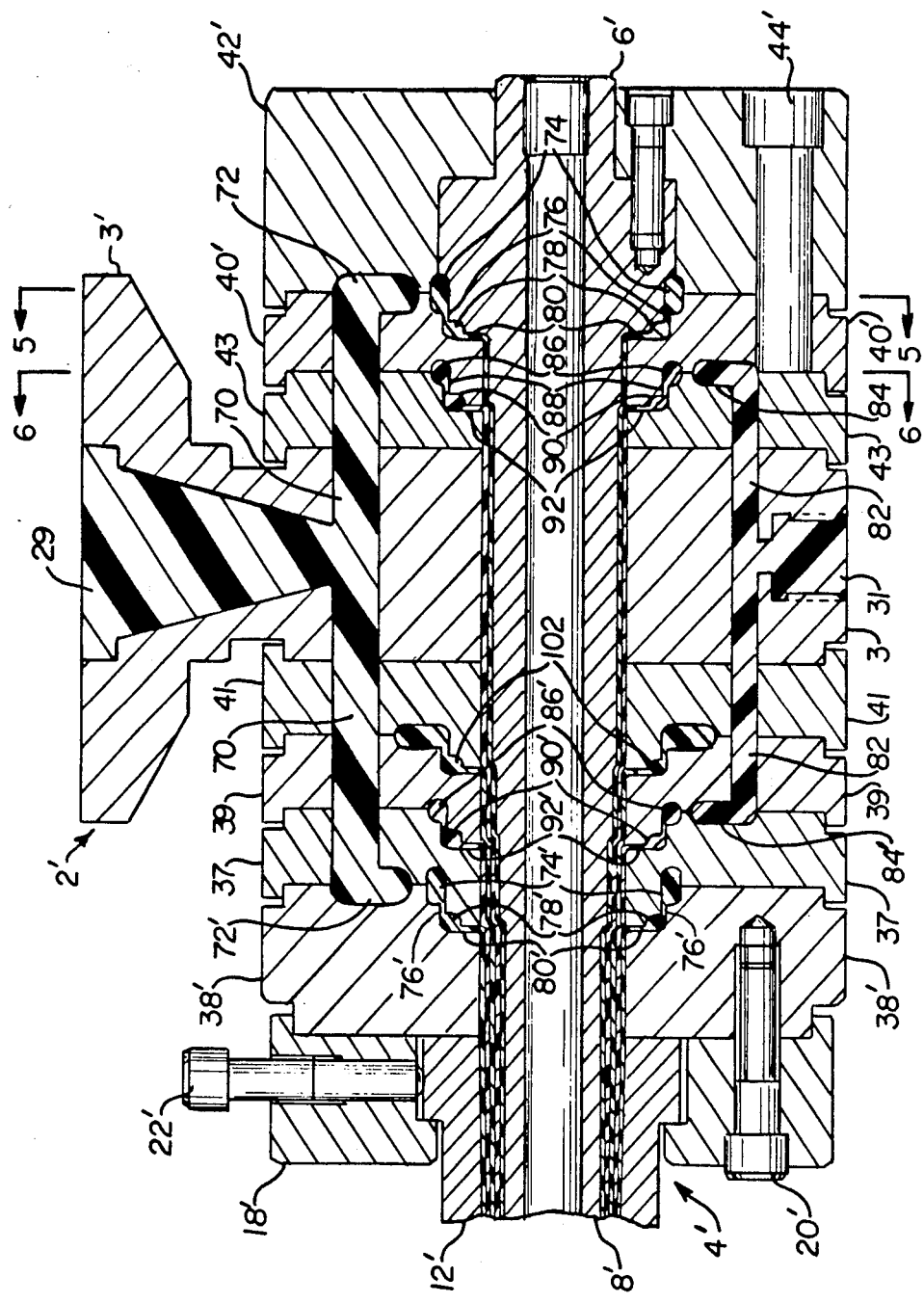
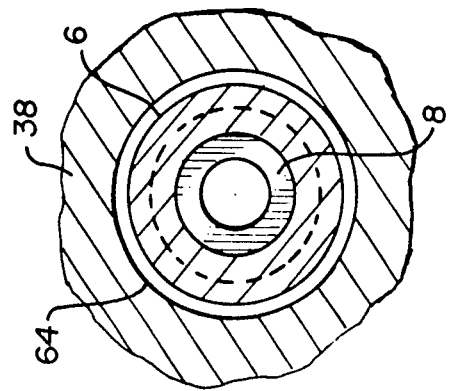
FIG. 4
FIG. 3

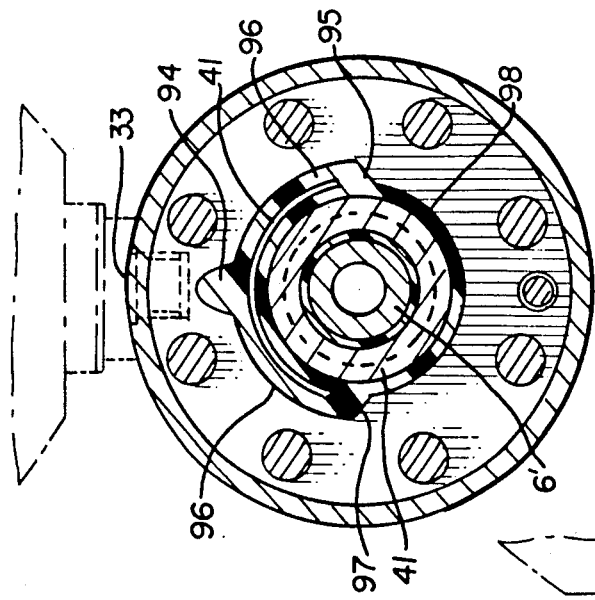
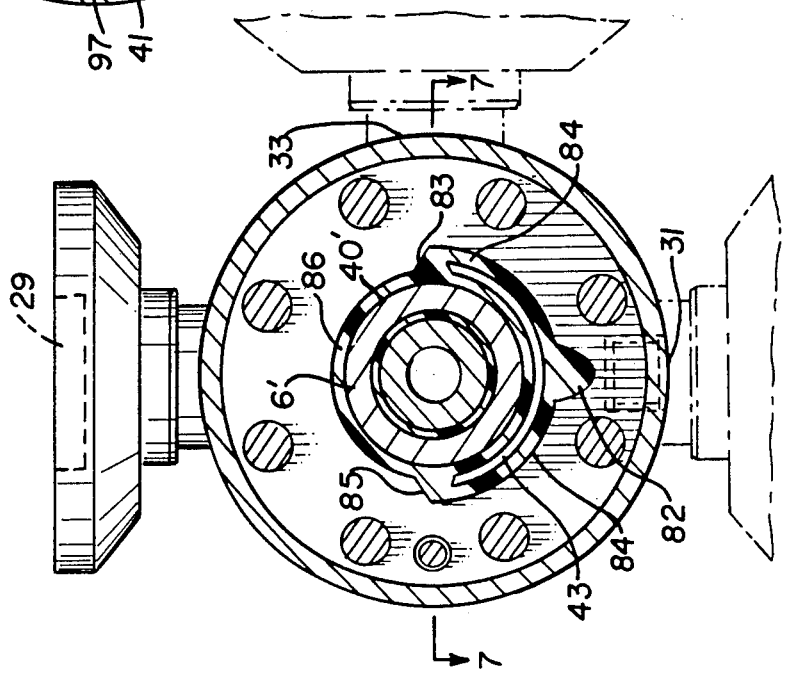
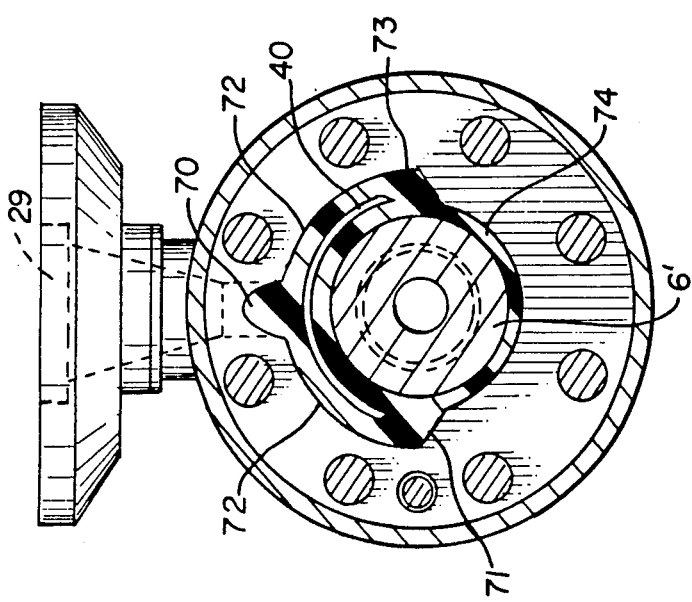

BALANCED FLOW EXTRUSION CROSSHEAD AND DIE ASSEMBLY

BACKGROUND OF THE INVENTION

The present invention relates generally to the extrusion of polymeric resins and like materials and, more particularly, to a crosshead and die assembly for the extrusion of single or multiple layers of thermoplastic materials. The invention is useful in the manufacture of concentric, tubular extrusions wherein uniform wall thickness is desirable, such as, for example, in the production of collapsible plastic squeeze tubes.

Heretofore, in the manufacture of continuous, concentric tubular extrusions, the thermoplastic resin, heated and under pressure from an extruder, enters the crosshead and die assembly and feeds a single resin distribution channel which is concentric, extending 360° about an inner mandrel. The thermoplastic resin flows around and over the mandrel without any or very little control which, if not corrected or compensated, results in uneven wall thicknesses in the final tubular product. This condition creates unbalanced pressure and flow around the mandrel, making it necessary to compensate by choking-off an area of the resin flow with an outer die adjustment in order to obtain a uniform wall thickness. Needless to say, this requires close attention by the operator and careful control over the operating parameters of heat and pressure. In addition, in prior systems, the resin flowing over and around the inner mandrel, from a single entry point, must divide into separate streams and subsequently recombine. There is turbulence in the recombining resin streams which creates an objectionable condition on the finished tubular product. As the molten resin changes direction of flow of approximately 90° in the crosshead, it also creates pockets of stagnated or nonflowing resin which causes limited special flow patterns and undesired channelling of the resin which disrupts the normally preferred laminar flow pattern. Such aberrations in the flow pattern of the resin carry through the crosshead and die assembly and appear in the extruded film or tubular shape or the like as a broad band or line commonly referred to as the weld line. In some cases, if the weld line is of sufficient intensity it may cause the tubular extrusion or other shape to rupture along the longitudinal axis of the extrusion. In addition, the outer surface of the extrusion in the area of the weld line is generally rougher than the balance of the extrusion periphery, which oftentimes presents cosmetic defects when the finished tube is to be decorated. In addition, when the thermoplastic resin is pigmented, the finished extrusion may also contain an area bordering the weld line of reduced or variable pigment concentration. This condition yields a nonuniform product which exhibits variant color striations in the finished tubing and may result in a quality rejection of the entire production run. Hence, it is readily appreciated that the crosshead and die devices commonly employed in the art have inherent shortcomings which require continuous and special operator attention in order to obtain uniform quality in the finished product.

The present invention is directed to a new and improved crosshead and die assembly which overcomes the problems heretofore encountered and provides an apparatus which produces balanced resin flow around the inner mandrel and is suitable for use in single layer as well as multi-layer extrusion operations for forming not only tubular products, but other formed or shaped extrusions such as flat sheet or folded tubular shapes. Products produced from the crosshead and die assembly of the present invention exhibit superior properties over those produced by known extrusion tooling while requiring less operator attention.

SUMMARY OF THE INVENTION

The balanced flow crosshead and die assembly of the present invention provides a substantially totally controlled flow pattern for the heated thermoplastic resin so as to assure a laminar flow of the resin throughout the entire 360° circumference of the crosshead and die assembly. The crosshead and die assembly of the present invention thus provides superior concentric tubular extrusions having a uniform thickness and exhibiting improved surface smoothness both on the inside and outside extrudate surfaces. In addition, the problem of weld line flow and color aberrations are virtually eliminated by the present invention. The invention is suitable in the manufacture of single layer continuous extrusions as well as in the manufacture of multiple layer concentric extrusions.

The improved crosshead and die assembly of the present invention overcomes the problems heretofore encountered by providing a balanced pressure and controlled flow pattern for the molten resin around a central mandrel by employing a plurality of concentric, ring-shaped resin distribution channels, with restrictive, 360° annular openings feeding the resin therebetween. Heated thermoplastic resin, supplied under pressure from a standard extruder, is introduced into an entry orifice which is formed in the crosshead at a 90° orientation relative to a longitudinal axis of the inner mandrel, which is coaxial with the extrusion axis. Communicating with the resin entry orifice is a first resin distribution channel which is formed as a 180° half-circle segment in the machined faces of a rear distributor plate and a mating front distributor plate. The first resin distribution channel extends around the mandrel, 90° on each side of the entry orifice and has two opposed entry gates or ports at its ends. Communicating with the entry ports of the first resin distribution channel is a second ring-shaped, resin distribution channel which extends concentrically 360° around the mandrel. The second distribution channel is also cut into the machined surfaces of the front and rear distributor plates and along the surface of the inner mandrel. Communicating with the second distribution channel, is a concentric 360° first restrictive annular passageway, which, in turn, communicates with a third resin distribution channel which is concentric and extends 360° around the mandrel. The third distribution channel may be smaller in cross-section than the first and second distribution channels. Heated resin is delivered from the third distribution channel to a second restrictive annular passageway which extends in a concentric manner 360° around the mandrel and is formed between the front distributor plate and the mandrel which delivers the heated resin to an annular opening formed by the front distributor plate and the inner mandrel. The heated resin is fed from the annular opening to a tapered section of the annular opening formed by an inner die and an outer die. This tapered section of the annular opening immediately joins a straight opening known as the die land where the extruded resin exits the die. The crosshead and die assembly of the present invention provides a controlled flow pattern for the heated thermoplastic resin through the use of a plurality of pressure and flow balancing rings in the form of a plurality of 360° distribution channels with restrictive annular openings therebetween, initially fed by a 180°, first distribution channel. A totally laminar flow of heated resin is achieved throughout the entire crosshead and die assembly with no pockets of stagnant resin or areas of limited special flow patterns as found in prior devices heretofore employed. Hence, the problems relating to weld line weaknesses, rough surfaces and color aberrations previously encountered are virtually eliminated by the balanced flow provided by the present invention.

The above-described crosshead and die assembly produces a single layer continuous, concentric tubular extrusion for the manufacture of, for example, collapsible plastic squeeze tubes. By providing the crosshead with additional sets of inlet orifices, each having first, second and third resin distribution channels and intermediate restrictive annular passageways, as described above, additional layers of resin may be extruded through the die assembly in order to produce a continuous concentric tubular-shaped article having multiple layers of resin. Of course, in such an arrangement, additional extruders or like machines are utilized to feed each of the additional inlet orifices. In a multiple layer extrusion crosshead and die arrangement, the inlet orifice for each extruder, is oriented generally 90° from an adjacent inlet orifice while the machined plates for each of the sets of distribution channels are stacked one against the other along the longitudinal axis of the mandrel.

BRIEF DESCRIPTION OF THE DRAWINGS

Other objects and advantages of the present invention will become readily apparent upon reference to the accompanying description when taken in conjunction with the following drawings, wherein:

FIG. 3 is a partially fragmented, cross-sectional view taken along line 3—3 of FIG. 1;

FIG. 4 is a partially fragmented, cross-sectional side view of a crosshead and die assembly of the present invention for use in forming a five layer extrusion;

FIG. 5 is a cross-sectional view taken along line 5—5 of FIG. 4;

FIG. 6 is a cross-sectional view taken along line 6—6 of FIG. 4;

FIG. 8 is a cross-sectional view taken along line 8—8 of FIG. 7.

DETAILED DESCRIPTION OF THE INVENTION

Figure 2:
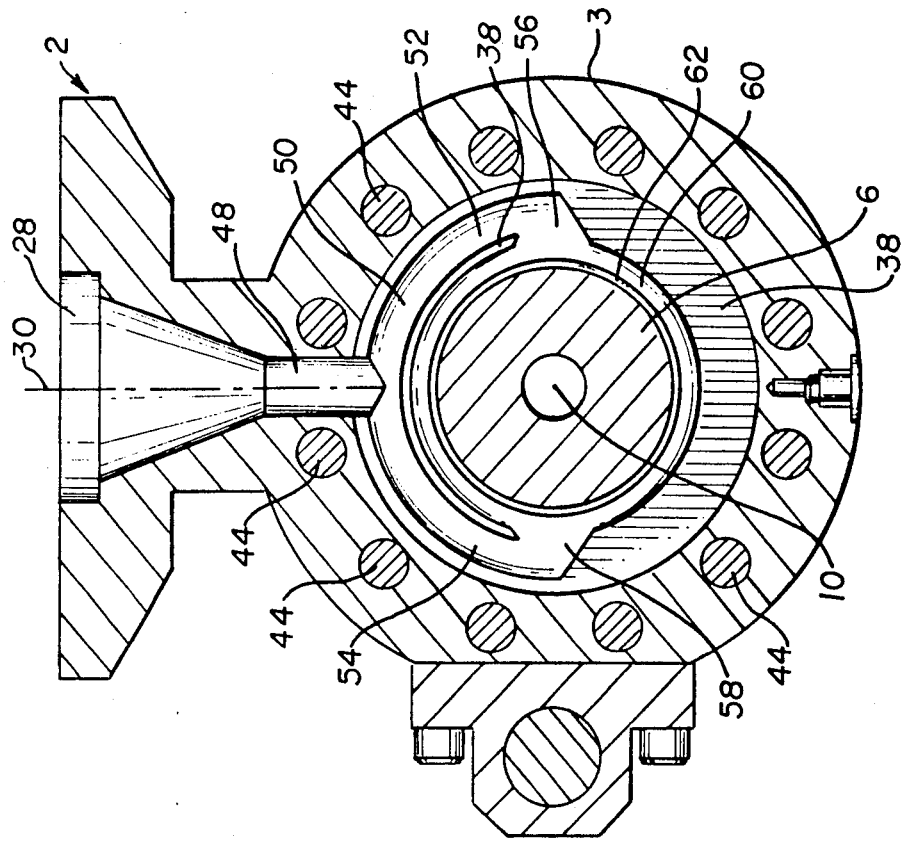
FIG. 2 is a cross-sectional view taken along line 2—2 of FIG. 1.

In the drawings, identical elements are identified by the same numerals throughout, while similar elements are identified by "primed" numerals in the various figures.

Figure 1:
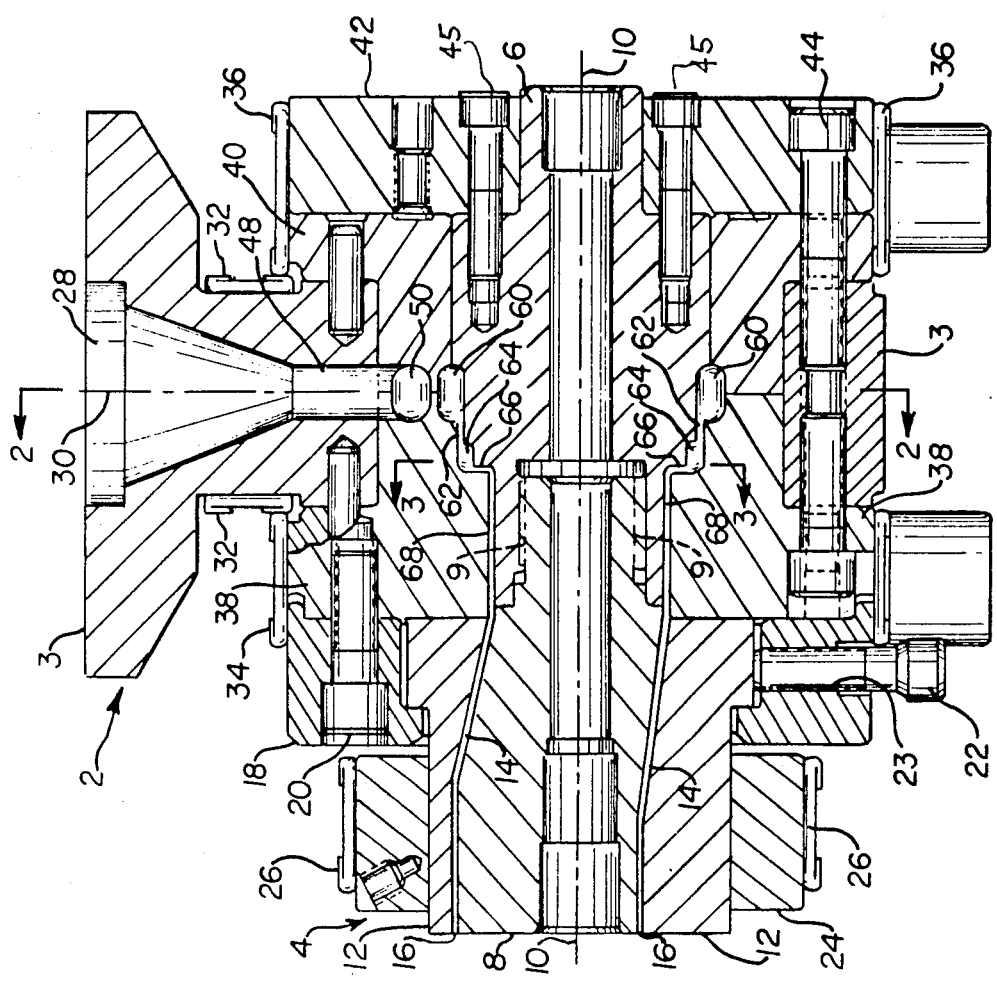
FIG. 1 is a cross-sectional side view of the crosshead and die assembly of the present invention for use in forming a single layer extrusion.

A presently preferred embodiment of the balanced flow crosshead and die assembly of the present invention is depicted in a basic form in FIGS. 1-3, wherein a single layer tubular extrusion is produced. The apparatus comprises a crosshead, generally designated 2, having a body member 3 and a die assembly, generally 4, bolted thereto. Heated polymeric resin such as polyethylene, polyvinyl chloride, or the like, in a molten state is delivered, under pressure from a standard extruder (not shown), to an injection orifice 28 formed in the side of the crosshead body 3. Orifice 28 communicates with a resin inlet passage 48 having a longitudinal axis 30 which is generally coaxial with the longitudinal axis of the extruder and perpendicular to a longitudinal axis 10 of a centrally disposed inner mandrel 6. Inner mandrel 6 is secured within the crosshead body 3 by a plurality of circumferentially spaced bolts 45 which pass through a rear clamping plate 42. The forward or downstream end of the inner mandrel 6 is threadably secured to an inner die member 8 by way of a threaded joint 9 formed at the overlapping portions of the respective members 8 and 6 as shown in FIG. 1. An annular open space formed between an outer die 12 and the inner die 8 describes a tapered land opening 14 at the die entry portion and a die land 16 at the die exit portion. After exiting from the land opening 16, the extruded resin is externally pulled to a sizing device (not shown) such as an internal forming mandrel or a vacuum sizing unit where the resin is sized and chilled to a dimensionally stable continuous shape of specified dimensions. The balanced flow crosshead and die assembly shown in FIGS. 1-3 is suitable for use in the manufacture of single layer continuous, concentric tubular extrusions which may be used, for example, in the manufacture of collapsible plastic squeeze tubes. Of course, as will be apparent to those skilled in the art, with appropriate modification in the configuration of the die 4, the balanced flow extrusion crosshead 2 is adapted for use in the manufacture of other formed or shaped extrusions such as, for example, flat sheet or folded tubular shapes.

The crosshead and die assembly depicted in FIG. 1 also contains conventional heating means, for example, electrical heating bands 26, 32, 34, 36 positioned at various exterior portions of the tooling. In the case of the annular heater band 26, a circular heat transfer spacer ring 24 is positioned around the outer die member 12. Die adjustment screws 22 bear against the perimeter of the outer die member 12 whereupon rotative movement of the screw 22 within the threaded bore 23 causes the bearing end of the screw 22 to move the outer die 12 relative to the inner die 8 for fine the adjustment purposes.

Still referring to FIGS. 1-3, heated resin under pressure from the extruder enters the crosshead 2 by way of the injection orifice 28 and the inlet passage 48 which communicates with a first resin distribution channel 50. The first distribution channel 50 extends approximately 180°, concentrically around the inner mandrel 6, 90° on each side of the passage 48. First channel 50 is preferably oval in cross-sectional shape and is formed in the machined faces of the rear distributor plate 40 and a front distributor plate 38, FIG. 1. As seen in the drawing, a one-half segment of the oval cross-section of the distributor channel 50 is formed in each respective plate 38 and 40. The rear distributor plate is secured within and to the crosshead body 3 by the rear clamping plate 42 and the bolts 44, while the front distribution plate 38 is held in place by a die clamping plate 18 and bolts 20.

The first resin distribution channel 50 comprises a first 90° segment 52 and a second 90° segment 54, as seen in FIG. 2. Segments 52 and 54, supply resin, respectively, to a first feed gate 56 and to a second feed gate 58 which are aligned at a 180° orientation to one another on opposite sides of the inner mandrel 6. Molten resin flows through the first and second feed gates 56 and 58 to a second resin distribution channel 60. Second resin distribution channel 60 is ring-shaped and continuously concentric, 360° around the inner mandrel 6. Channel 60 is formed in the confronting machined surfaces of the rear distribution plate 40 and the front distribution plate 38 and the inner mandrel 6, FIG. 1. The molten resin flows from the channel 60 through a first restrictive annular passage 62 which is formed concentrically, 360° between the inner mandrel 6 and the front distributor plate 38. The heated resin then flows from the restrictive passage 62 to a third resin distribution channel 64. Channel 64 is also continuously concentric, 360° around the inner mandrel 6 and is formed by machining confronting surfaces of the inner mandrel 6 and the front distribution plate 38. The third resin distribution channel 64 is also preferably oval in cross-sectional shape. Molten resin from the third distribution channel 64 is delivered to a second restrictive annular passageway 66 which also is formed concentrically 360° around the inner mandrel 6, confronting a spaced-apart section formed in the front distributor plate 38. The second restrictive annular passageway 66 communicates with an annular opening 68 formed between the mandrel 6 and the plate 38. The flowing resin from opening 68 enters the tapered land opening 14 which then immediately joins the straight annular opening 16 of the die land which is formed between the inner and outer dies 8 and 12, respectively. The shaped resin product is then externally sized and chilled to a dimensionally stable condition having a continuous shape of predetermined internal diameter and wall thickness. In plastic tube operations, the continuous length of extruded tube is thereafter cut into appropriate lengths for further processing.

The crosshead 2 thus provides a controlled flow pattern of molten resin through the employment of a plurality of ring-shaped resin distribution channels and annular restrictive passages in order to provide a totally balanced laminar resin flow 360° around the crosshead and die assembly. The first resin distribution channel 50, having the two 180° opposed feed gates 56 and 58 assures an equalized resin feed pressure and, hence, a balanced resin flow pattern and feed rate to the second resin distribution channel 60, with no plugs or dead spots in the first resin distribution channel 50. Likewise, the continuous 360° configuration of the second resin distribution channel 60 and the 360° configuration of the first restrictive annular passageway 62 further assures balanced pressure and uniform flow between the second distribution channel 60 and the third resin distribution channel 64. Since the third distribution channel 64 as well as the second restrictive annular passageway 66 communicating therewith are also formed continuously around the inner mandrel 6, equalized resin pressure around the mandrel is maintained. Thus, the invention employs a plurality of balancing rings and restrictive openings which provide a uniform pressure distribution around the mandrel, resulting in a true concentric tubular extrusion of uniform thickness. In addition, the invention yields an improved smoothness of inside and outside extrudate surfaces with a virtual elimination of the problem of weld line flow and color aberrations.

The balanced flow crosshead and die assembly of the present invention is suitable for use in the manufacture of single layer extrusions as shown in the apparatus of FIGS. 1-3 and, in addition, is suitable in the manufacture of extrusions having multiple layers of uniform thickness around the circumference of each. By adding additional distributor plates to the crosshead tooling, where the plates contain the above-described first, second and third distribution channels with intermediate annular restrictive passageways therebetween, balanced flow is achieved for each of the resin layers to be added. Apparatus employing the principles of the present invention in the manufacture of a five layer tubular extrusion is shown in FIGS. 4-8. In FIGS. 4-8, the die land space between the inner and outer die members 8' and 12' is greatly exaggerated in order to show the individual extrusion layers more clearly. In practice, the size of the space would be similar to the die land 16 of FIG. 1.

The five layer crosshead and die assembly configuration depicted in the drawings employs three injection orificies 29, 33 and 31, having longitudinal axes generally transverse to the extrusion axis, FIG. 6. In the five layer extrusion arrangement shown, and specifically referring to FIGS. 4 and 5, resin for the innermost and outermost layers of the five layer tubular extrusion is supplied by the inlet orifice 29. Inlet orifice 29 communicates with a longitudinally extending channel or runner 70 which is drilled or otherwise formed in the crosshead body 3' and in a plurality of stacked, intermediate distributor plates designated 37, 39, 41, 43, and 40'. Resin for the innermost layer of the five layer extrusion is delivered by way of the runner 70 to a first resin distribution channel 72 which extends around the mandrel 6' 180°, terminating with gate sections 71 and 73 which feed molten resin to a second resin distribution channel 74, FIG. 5. Second distribution channel 74 supplies heated material to a third resin distribution channel 78 by way of a first annular restrictive passageway 76 which extends 360° around the inner mandrel 6'. Heated resin from the third distribution channel 78 flows into a second restrictive annular passageway 80 and thence flows 360° around the inner mandrel 6' in a uniform manner. As seen in FIG. 4, the first resin distribution channel 72 is formed in confronting faces of the rear clamping plate 42' and the rear distributor plate 40'; the second resin distribution channel 74 is formed in confronting portions of the clamping plate 42', the inner mandrel 6', and the rear distributor plate 40'. The remaining elements, namely, the third resin distribution channel 78, as well as the first and second restrictive annular passageways 76 and 80, respectively, are machined in confronting surfaces of the inner mandrel 6' and the rear distributor plate 40'. At the down stream end of the runner 70, the resin introduced at orifice inlet 29 is supplied as the outermost or fifth layer of the tubular extrusion by way of a balanced resin flow distribution system in the same manner as previously described. The balanced flow system comprises a first resin distribution channel 72' which extends 180° around the inner mandrel 6' which supplies heated resin to a second 360° resin distribution channel 74'. Channel 74' supplies resin to a first restrictive annular passageway 76' and thence to a third resin distribution channel 78'. Ring-shaped channel 78' feeds resin to a second restrictive annular passage 80' for uniform distribution along the outer surface of the moving tubular extrusion, which is moving from right to left in the side views of FIGS. 1, 4 and 7.

As noted in the drawings, and as described above, the innermost and outermost, or first and fifth layers of the multi-layer tube are supplied by the inlet orifice 29. The second and fourth layers of the extrusions, which may be in the form of an adhesive material, are supplied by way of the inlet orifice 31 while the third layer which may be a barrier polymer, or the like, is supplied by the inlet orifice 33.

Referring to FIGS. 4 and 6, the adhesive material is supplied under pressure at the inlet orifice 31 by a suitable injection apparatus (not shown) and flows through a longitudinally extending runner 82 to a first resin distribution channel 84 to form the second layer of the multi-layer extrusion and to distribution channel 84' to form the fourth layer. The balanced flow distribution channels are the same as previously described in that the first resin distribution channel 84 extends 180° around the inner mandrel 6' and has a pair of feed gates 83 and 85 which communicate with a second resin distribution channel 86 which extends 360° around the inner mandrel 6', FIG. 6. The flowable adhesive material is urged under pressure through a first restrictive annular passage 88 which communicates with a third resin distribution channel 90 and a second restrictive annular passageway 92 which delivers the second layer of adhesive material to the outer surface of the innermost layer of resin as it moves along the mandrel 6'. The second end of the runner 82 supplies the adhesive material to a first resin distribution channel 84' which communicates with second and third 360° resin distribution channels 86' and 90' which, in turn, communicate with a second restrictive annular passageway 92' to form the fourth layer of the multi-layer extrusion.

Figure 7:
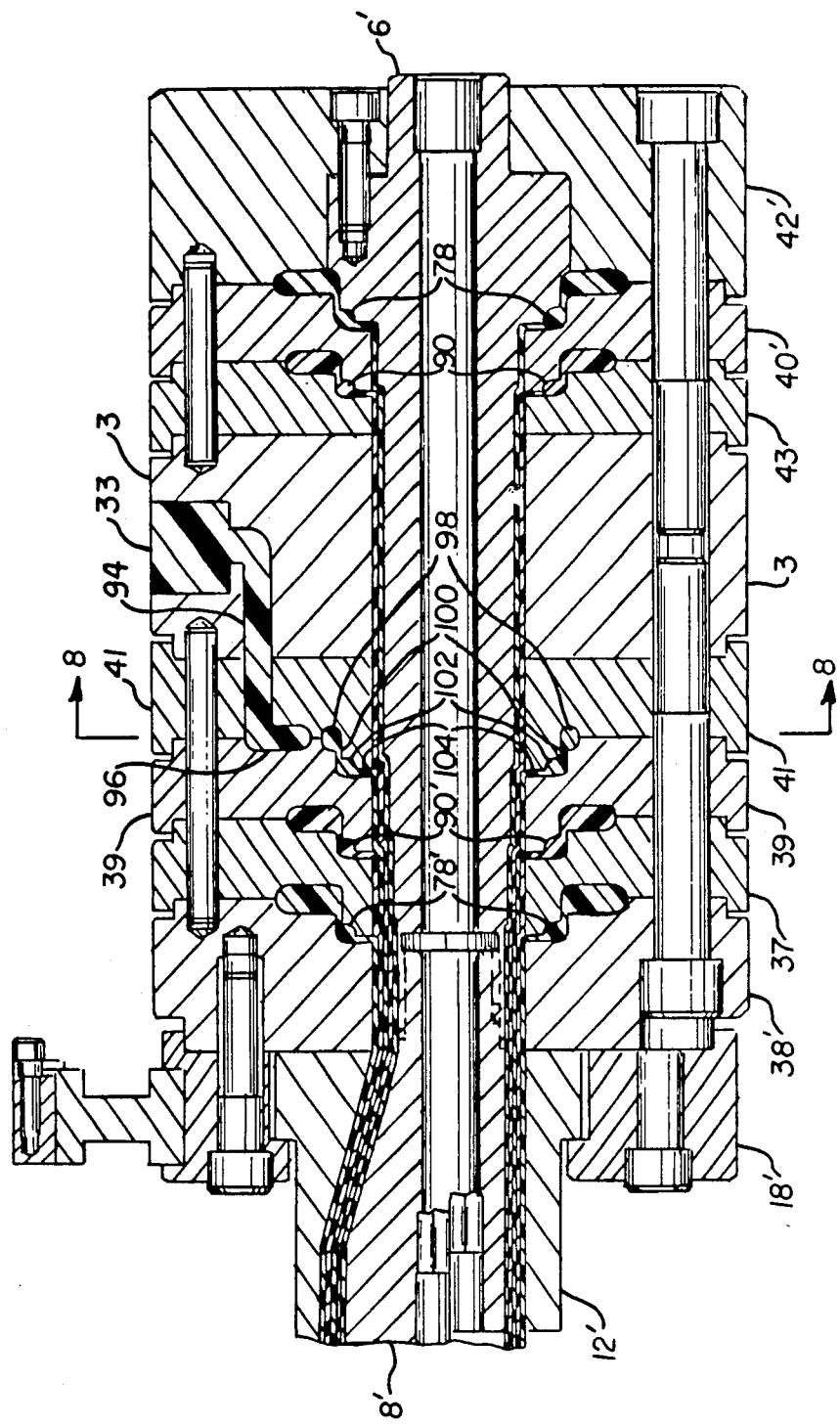
FIG. 7 is a cross-sectional view taken along line 7—7 of FIG. 6.

The third layer of the tubular extrusion may be in the form of a barrier polymer to prevent the migration of oxygen through the multi-layer construction and is supplied by way of the inlet orifice 33 shown in FIGS. 7 and 8. Orifice 33 is formed in the crosshead body member 3 and communicates with a longitudinally extending runner 94 formed within the body member 3 and with a first resin distribution channel 96 which, likewise, extends 180° around the mandrel 6' terminating in feed gates 95 and 97. Gates 95 and 97 supply heated polymer to a second resin distribution channel 98 which is formed 360° around the inner mandrel 6'. A first restrictive annular passageway 100 communicates with the second resin distribution channel 98 and a third resin distribution channel 102, also formed 360° around the inner mandrel 6'. Third distribution channel 102 communicates with a second restrictive annular passageway 104 which supplies the barrier polymer as the third layer on the moving tubular extrusion at the interface between the intermediate distributor plate 39 and the inner mandrel 6'. The balanced flow distribution channels and the restrictive annular passageways 98, 100, 102 and 104 are formed in confronting machined surfaces of the intermediate distributor plates 41 and 39 as shown in FIG. 7. The same machining technique is employed to form the resin distribution flow channels and restrictive passageways previously described. As seen in FIGS. 4 and 7 the balanced flow resin distribution channels and restrictive annular passages 72-80 are formed in confronting, machined surfaces of the clamping plate 42', the rear distributor plate 40' and the inner mandrel 6'. The resin distribution channels and communicating restrictive annular passageways 86-92 which supply the second layer of material are formed in confronting, machined surfaces of the rear distributor plate 40' and the intermediate distributor plate 43. The third layer is supplied by resin distribution channels and annular passageways 96-104 formed in the confronting, machined surfaces of the intermediate distributor plates 41 and 39, as described above. The fourth layer is supplied by resin distribution channels and restrictive annular passageways 86'-92' formed in the confronting, machined surfaces of the intermediate distributor plate 37 and 39. The fifth layer is supplied by the resin distribution channels and annular passageways 72'-80' formed in the confronting, machined surfaces of the front distributor plate 38' and the intermediate distributor plate 37.

The above-described sets of first, second and third resin distribution channels, which are formed in the confronting surfaces of the distributor plates of FIGS. 4 and 7, each possess an oval cross-sectional shape, the same as those depicted in the embodiment of FIG. 1. A one-half segment of each oval cross-section is formed into each of the confronting surfaces of the abutting pairs of distribution plates. In FIG. 4, for example, the first, second and third resin distribution channels 72', 74' and 78' are formed in the confronting surfaces of an abutting pair of intermediate distribution plates, comprising plates 37 and 38'. The next abutting pair of intermediate distribution plates comprises plates 37 and 39 which contain the first, second and third resin distribution channels designated 84', 86' and 90'. The remaining sets of resin distribution channels are similarly formed in the remaining abutting pairs of intermediate distribution plates, namely, the pairs consisting of plates 39 and 41; plates 43 and 40'; and plates 40' and 42', along with the mandrel 6'. As noted in the drawings, the cross-sectional area of the oval-shaped resin distribution channels progressively decreases from the first channel to the second channel to the third channel. In this manner, balanced flow and resin pressure is maintained around the crosshead so as to achieve laminar flow around the mandrel and within the die land. The provision of having at least two ring-shaped resin distribution channels and two 360° metering slots in the form of the restrictive annular openings, assures that a uniform resin color pigmentation is delivered to the mandrel and die land, which is particularly beneficial in extruding certain pearlescent resins.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

Having described the invention, what is claimed is:

1. A balanced flow crosshead and die assembly for the extrusion of polymeric resins and like materials comprising:

crosshead body means having at least one inlet orifice formed therein adapted to receive heated resin from a pressurized source;

a first resin distribution channel extending about 180° circumferentially around an inner mandrel positioned within the crosshead body, said first channel terminating in end portions having gate orifices formed therein and communicating with said inlet orifice at a point intermediate the gate orifices thereof;

said crosshead body means having at least a pair of ring-shaped second and third resin distribution channels extending 360° circumferentially around said inner mandrel positioned within the crosshead body, and wherein said second ring-shaped resin distribution channel communicates with said first resin distribution channel at each of the gate orifices thereof;

said crosshead body means also having a plurality of restrictive annular passages, each extending 360° circumferentially around said mandrel communicating between adjacent ring-shaped resin distribution channels and wherein a last of said restrictive annular passages communicates with a last of said ring-shaped resin distribution channels and with an annular opening extending between said crosshead body and said inner mandrel; and die means having a die land communicating with said annular opening adjacent said inner mandrel adapted to receive the resin or like material therethrough, whereby, in operation, resin from said pressurized source continuously flows from the inlet orifice through said first, second and third resin distribution channels and intermediate restrictive annular passages to form an extrusion layer within said die means.

2. A crosshead and die assembly according to claim 1 wherein the inlet orifice has a longitudinal axis which is substantially transverse to a longitudinal axis of said inner mandrel.

3. A crosshead and die assembly according to claim 2 which includes two ring-shaped resin distribution channels and two restrictive annular passages.

4. A crosshead and die assembly according to claim 3 wherein said die means has an annularly shaped die land for producing a tubular extrusion.

5. A crosshead and die assembly according to claim 1 including a plurality of plate means having resin distribution means formed therein and adapted to communicate with a source of resin or like material under pressure, wherein each plate means is adapted to supply resin or like material to an annular opening extending between said plate means and said inner mandrel, to form an additional extrusion layer around a layer previously formed.

6. A crosshead and die assembly according to claim 5 wherein each plate means comprises a pair of abutting plate members secured to the crosshead body and longitudinally spaced along the inner mandrel, said plate members including confronting surface portions having a plurality of resin distribution channels formed therebetween, at least a pair of said resin distribution channels having a ring-shape extending 360° around said inner mandrel and said confronting surface portion also having at least a pair of restrictive annular openings formed therebetween, wherein one of said restrictive annular openings communicates between adjacent pairs of ring-shaped resin distribution channels and wherein another of said restrictive annular openings communicates with a last of said ring-shaped resin distribution channels and with an annular opening extending between said plate members and said inner mandrel.

7. A crosshead and die assembly according to claim 6 wherein the assembly includes five pairs of abutting plate members and is adapted to produce a turbular extrusion of five layers.

8. A balanced flow crosshead and die assembly for the extrusion of polymeric resins and like materials comprising:

crosshead body means having at least one inlet orifice formed therein adapted to receive molten resin from a pressurized source, said inlet orifice having a longitudinal axis substantially perpendicular to a longitudinal extrusion axis defined by an inner mandrel situated within said crosshead body means; said crosshead means having a first resin distribution channel formed therein and extending about 180° circumferentially around said mandrel and terminating in end portions having gate orifices therein, said first resin distribution channel communicating with said inlet orifice at a point intermediate the ends thereof;

said crosshead body means having a second resin distribution channel formed therein and extending 360° circumferentially around said inner mandrel and communicating with said gate orifices of said first resin distribution channel; said crosshead body means having a third resin distribution channel formed therein and extending 360° circumferentially around said mandrel and concentric relative to said second channel; said crosshead body means also having first and second restrictive annular passages, each extending 360° circumferentially around said inner mandrel, said first restrictive annular passage communicating with said second and third resin distribution channels, and said second restrictive annular passage communicating with said third resin distribution channel and an annular opening extending between said crosshead body means and said inner mandrel; and die means having a die land communicating with said annular opening adjacent said inner mandrel adapted to receive the resin or like material therethrough.

9. A crosshead and die assembly according to claim 8 wherein said die means has an annularly shaped die land for producing a tubular extrusion.

10. A crosshead and die assembly according to claim 8 wherein the first, second and third resin distribution channels each have a cross-section in the shape of an oval and wherein the cross-sectional area of said first channel is greater than that of said second channel and the cross-sectional area of said second channel is greater than that of said third channel.

* * * * *